(12) United States Patent
Glaser

(10) Patent No.: US 6,375,995 B1
(45) Date of Patent: Apr. 23, 2002

(54) MULTI-DENSITY CEREAL PRODUCT

(76) Inventor: Lawrence F. Glaser, 10705 Averett Dr., Fairfax Station, VA (US) 22039

( * ) Notice: Subject to any disclaimer, the term of this patent is extended or adjusted under 35 U.S.C. 154(b) by 0 days.

(21) Appl. No.: 09/063,407

(22) Filed: Apr. 21, 1998

(51) Int. Cl.[7] ............................................. A23L 1/164
(52) U.S. Cl. ..................... 426/104; 426/620; 426/621
(58) Field of Search ................ 426/620, 621, 426/559, 560, 307, 104

(56) References Cited

U.S. PATENT DOCUMENTS

| | | | | |
|---|---|---|---|---|
| 2,333,442 A | * | 11/1943 | Rex ............................. | 426/83 |
| 2,707,153 A | * | 4/1955 | Bettman ........................ | 99/83 |
| 3,785,425 A | | 1/1974 | Hyldon ......................... | 159/11 |
| 3,876,811 A | * | 4/1975 | Bonner et al. ................. | 426/93 |
| 4,180,594 A | * | 12/1979 | Graf ............................. | 426/560 |
| 4,357,358 A | * | 11/1982 | Schanze ....................... | 426/62 |
| 4,515,822 A | | 5/1985 | Kraig et al. ................... | 426/445 |
| 4,517,210 A | | 5/1985 | Fogel ........................... | 426/392 |
| 4,620,981 A | | 11/1986 | Gordon et al. ................. | 426/448 |
| 4,759,942 A | | 7/1988 | Von Fulger ................... | 426/621 |
| 4,795,651 A | * | 1/1989 | Henderson et al. ........... | 426/456 |
| 4,853,235 A | * | 8/1989 | Tomomatsu ................... | 426/620 |
| 4,940,593 A | * | 7/1990 | Duffy ............................ | 426/94 |
| 4,981,711 A | * | 1/1991 | Kearns et al. ................. | 426/1 |
| 5,143,740 A | | 9/1992 | Blanchard et al. ............ | 426/446 |
| 5,151,283 A | | 9/1992 | Foehse et al. ................. | 426/93 |
| 5,176,936 A | | 1/1993 | Creighton et al. ............ | 426/618 |
| 5,196,218 A | * | 3/1993 | Schwab et al. ............... | 426/241 |
| 5,213,832 A | * | 5/1993 | Johnson et al. ............... | 426/425 |
| 5,275,831 A | | 1/1994 | Smith et al. ................... | 426/93 |
| 5,338,556 A | | 8/1994 | Schwab et al. ............... | 426/241 |
| 5,547,133 A | | 8/1996 | Rogers et al. ................. | 241/9 |
| 5,558,890 A | * | 9/1996 | Brown et al. .................. | 426/94 |
| 5,622,744 A | | 4/1997 | Matson et al. ................. | 426/623 |
| 5,695,805 A | * | 12/1997 | Borek et al. .................. | 426/620 |
| 5,709,902 A | | 1/1998 | Bartolomei et al. .......... | 426/620 |
| 5,827,564 A | * | 10/1998 | Bodkin, Sr. ................... | 426/620 |

OTHER PUBLICATIONS

Dillon, P. Going Nuts . . . or maybe a little fruity: fruits and nuts are the "secret" ingredients that help create naturally nutritious foods. Food Engineering., v63, n5, p. 101 (3), May 1991.*

* cited by examiner

Primary Examiner—Arthur L. Corbin
(74) Attorney, Agent, or Firm—Eric J. Robinson; Nixon Peabody LLP

(57) ABSTRACT

A consumer cereal product including at least first and second portions, the first portion having a specific gravity less than a liquid, such as milk, so that it floats in the liquid, and the second portion having a specific gravity greater than that liquid so that it sinks therein. Alternatively, cereal is provided having a specific gravity less than a liquid so that the cereal floats, and a portion is coated with a soluble substance having a density sufficient to cause that portion to sink. As the coating dissolves, the coated portion becomes more buoyant and rises to the top of the liquid. In a further embodiment, cereal is provided wherein each piece of cereal has a specific gravity low enough to float in a liquid and includes a first and second portion, the first portion having a higher density than the second portion so that the cereal piece floats with the lower density portion to the top. A soluble coating is provided over the lower density portion to increase the density of this portion such that the cereal piece initially floats with the higher density portion to the top. As the coating dissolves, the cereal rotates so that the lower density portion is toward the top. In each case, the cereal is colored, textured, shaped, sized, or otherwise differentiated to provide entertainment to a consumer of the product. The various embodiments can be combined as desired to achieve a cereal product that provides amusement and entertainment to consumers thereof.

34 Claims, 3 Drawing Sheets

MULTI-DENSITY CEREAL PRODUCT

BACKGROUND OF THE INVENTION

The ready-to-eat cereal product market is very large with sales averaging above $10 billion a year and substantial profits are available for manufacturers due to the relatively low cost associated with the production of most cereal products. Since many cereal products are fundamentally similar in quality, nutritional content, taste and other factors typically used by consumers to differentiate foodstuffs, most cereal manufacturers rely on a combination of packaging, advertisements, and consumer promotions to provide product differentiation and a corresponding increase in sales.

For example, cereal advertising is heavily targeted toward children, the primary consumer of many cereal products, and often includes animated characters that appeal to younger children. Also, many cereal products include prizes or awards that are contained within the cereal package or that can be received after the purchase of a predetermined number of boxes of the cereal. Still other cereal products include various confections, such as marshmallow "charms," colorful "berries," or sugary "frostings" designed to appeal to younger consumers, or strive for differentiation through variations in color or shape of the cereal product.

Over time, however, the ability to distinguish one manufacturer's cereal product from another's has diminished as all manufacturer's have adopted the above strategies to increase product sales. Consumer promotions, variations in color and the inclusion of confections permeate the consumer cereal market. As a result, there is a need to provide a novel cereal product that appeals to cereal consumers, and particularly to younger consumers that constitute a disproportionately larger portion of cereal consumers. Any marketing advantage, no matter how slight, can easily result in increased sales and profits sufficient to justify its cost.

Prior art cereal products are known where the cereal floats or sinks when placed in milk. In these prior art cereals, however, there is no differentiation between the different cereal pieces. That is, the entire portion of cereal either floats or sinks and there is no intended difference in buoyancy between cereal pieces. Furthermore, prior art cereals fail to recognize that the cereal product should have specific physical attributes (such as color, shape, size or taste) that correspond to the buoyancy of the cereal.

FIG. 1A illustrates one such prior art cereal including bowl 10, liquid, such as milk, 12 and a plurality of cereal pieces 14. As shown in FIG. 1A, cereal pieces 14 all have a density less than that of the liquid 12 and thus float in liquid 12. Conversely, FIG. 1B illustrates a plurality of cereal pieces 16 having a density greater than that of liquid 12, and thus the cereal pieces 16 sink when placed in liquid 12.

U.S. Pat. No. 4,515,822 to Kraig et al. generally discloses that many puffed cereals have a relatively light density such that they float in milk. The reference addresses problems associated with the addition of fruit to such cereals, for example, that when milk is added, the puffed cereal pieces float while the fruit sinks out of sight in the milk. To solve this problem, Kraig et al. discloses puffed fruit pieces for incorporation into ready-to-eat cereals wherein the puffed fruit pieces are characterized by a low density of from 0.15 to 0.40 grams per cc. and thus do not sink in milk.

Kraig et al., however, fails to disclose a cereal product wherein a first portion of cereal floats in milk and a second portion of cereal sinks, or any relationship between physical characteristics of the cereal and the buoyancy thereof. In fact, the reference teaches that such a result is undesirable in that one primary object of the invention disclosed in Kraig et al. is to avoid a cereal product wherein a first portion of the product (cereal) floats while a second portion of the product (fruit) sinks. Rather, the reference teaches that it is desirable that the entire product, including the fruit and cereal, float on the surface of milk.

U.S. Pat. No. 4,759,942 to Von Fulger generally discloses expanded cereals having a specific density of from 0.15 to 0.40 grams per cc. The reference, however, is directed to a process for producing a high fiber content direct expanded ready-to-eat breakfast cereal and clearly fails to disclose or suggest a cereal product having a first portion that floats in a liquid such as milk and a second portion that sinks therein.

U.S. Pat. No. 5,622,744 to Matson et al. discloses a method for producing sinking aquatic feed and densified cattle "range cubes" wherein the final animal feed product is dense enough to sink in water. The reference, however, fails to disclose or suggest such a method for use with human consumable cereal products and further fails to suggest that the product should be formed such that a first portion floats and a second portion sinks. Rather, Matson et al. strive for an animal feed product that uniformly sinks in water.

SUMMARY OF THE INVENTION

It is an object of the present invention to provide a ready-to-eat cereal product that solves the above disadvantages and provides a cereal product having enhanced marketing characteristics.

It is another of the present invention to provide a novel cereal product that appeals to younger consumers, such a children.

It is yet another object of the present invention to provide a ready-to-eat cereal product that achieves enhanced product differentiation from other available consumer cereal products.

It is a further object of the present invention to provide a cereal product having unique characteristics that appeal to cereal consumers and provides a marketing advantage.

It is a still further object of the present invention to provide a consumer cereal product including multiple portions of cereal having different physical characteristics that provide amusement and entertainment to consumers of the cereal product.

It is yet another object of the present invention to provide a consumer cereal product including multiple portions of cereal having differing densities such that the multiple portions experience differing buoyancies in a liquid such as milk.

It is another object of the present invention to provide a consumer ready-to-eat cereal product wherein a first portion of cereal has physical characteristics that differ from a second portion of cereal, wherein the first and second portions of cereal have differing densities such that the portions experience differing buoyancies in a liquid such as milk.

It is a further object of the present invention to provide a cereal product wherein a first portion of the cereal floats in a liquid, such as milk, and a second portion of the cereal sinks in the liquid.

It is another object of the present invention to provide a cereal product that includes a portion of cereal with a specific gravity greater than 1 with respect to milk.

It is yet another object of the present invention to provide a consumer cereal product including a portion having a soluble coating formed thereon that causes the portion to sink in a liquid such as milk, wherein the portion will rise and float in the liquid when the soluble coating dissolves.

It is an object of the present invention to provide a cereal product wherein a portion of the cereal has a specific gravity less than 1 with respect to milk and is coated with a soluble substance that increases the specific gravity of that portion of the cereal to a value greater than 1 with respect to milk.

It is a further object of the present invention to provide a consumer cereal product wherein each of a plurality of pieces of cereal has a specific gravity low enough to float in a liquid such as milk and includes a first and second portion, the first portion having a higher density than the second portion so that the cereal piece tends to float with the lower density portion to the top.

It is a further object of the present invention to provide such a cereal product wherein a soluble coating is provided over the lower density portion to increase the density of this portion such that the cereal piece initially floats with the higher density portion to the top and, as the coating dissolves, the cereal piece rotates so that the lower density portion is toward the top.

It is a further object of the present invention to provide a consumer cereal product that includes a first cereal portion having a density different from a second cereal portion, wherein the first and second portions further differ in color, shape, size or other characteristic.

These and other objects are achieved in the present invention through the provision of a consumer cereal product including first and second portions, the first portion having a specific gravity less than 1 with respect to a liquid, such as milk, so that it floats in the liquid, and the second portion having a specific gravity greater than 1 with respect to that liquid so that it sinks therein. In an alternative embodiment, a cereal is provided having a density less than a liquid so that the cereal floats therein and a portion of the cereal is coated with a soluble substance having a density sufficient to cause that portion of the cereal to sink in the liquid. As the coating dissolves, the cereal becomes more buoyant and rises to the top of the liquid. In a further embodiment, a cereal product is provided wherein each piece of cereal has a specific gravity low enough to float in a liquid such as milk and includes a first and second portion, the first portion having a higher density than the second portion so that the cereal piece tends to float with the lower density portion to the top. A soluble coating is provided over the lower density portion to increase the density of this portion such that the cereal piece initially floats with the higher density portion to the top. As the coating dissolves, the cereal piece rotates so that the lower density portion is toward the top. In each case, the cereal is colored, textured, shaped, sized, or otherwise physically differentiated to provide amusement and entertainment to a consumer of the product. The various embodiments can be combined as desired to achieve a cereal product that provides amusement and entertainment to consumers thereof.

DETAILED DESCRIPTION OF THE PREFERRED EMBODIMENTS

The term "specific gravity" as it is used in this specification refers to the relative density of a cereal product and is the ratio of its density to the density of a liquid, such as water. Since the density of water is substantially the same as that of milk or other liquids used with consumer cereal products, the term "specific gravity" is broadly intended to refer to the density of a consumer cereal product relative to any liquid used by the consumer in connection with the cereal product. Cereal having a density less than such a liquid will float, while cereal having a density greater than that liquid will sink. Therefore, cereal having a specific gravity less than 1 will float, while cereal having a specific gravity greater than 1 will sink.

In practice, cereal is rarely homogeneous, but rather includes variations in the physical characteristics of the material or contains voids or openings that form air pockets within the cereal when it is placed in a liquid. The term "effective specific gravity" is used in this specification to refer to the density of a cereal piece taking into account such variations in material or trapped air relative to any liquid used by the consumer in connection with the cereal product.

Ready-to-eat cereals may generally be grouped into two broad categories, puffed and unpuffed cereals. Unpuffed cereals include flaked cereals such as corn flakes, wheat flakes, rice flakes, mixed grain flakes, etc., shredded whole grain cereals, extruded and other shredded cereals, and granola cereals. The preparation of these unpuffed cereal types often includes a toasting operation that causes a modest increase in volume (e.g. a two-fold or less increase). To the contrary, puffed cereals generally formed from puffing cereal pellets achieve a greater increase in volume (e.g. a five-fold to nine-fold increase). As a result, unpuffed cereal products will generally have a greater density than puffed cereal products and puffed and unpuffed cereal products may be advantageously combined in a single consumer cereal package as described below in accordance with the present invention.

Figure 1A:
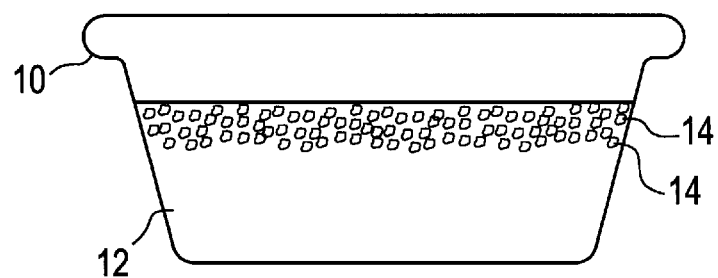
FIG. 1A illustrates a prior art cereal product wherein the cereal has a density less than that of a liquid in which it is placed and thus floats in the liquid.
Figure 1B:
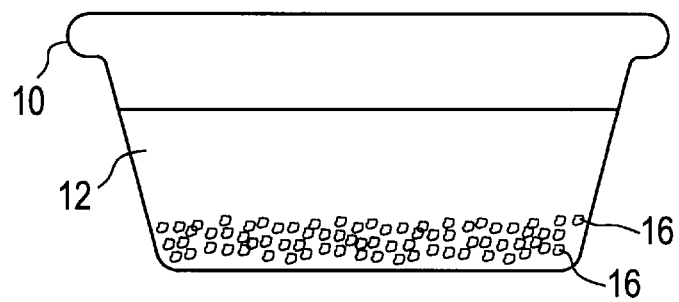
FIG. 1B illustrates a prior art cereal product wherein the cereal has a density greater than that of a liquid in which it is placed and thus sinks in the liquid.
Figure 2:
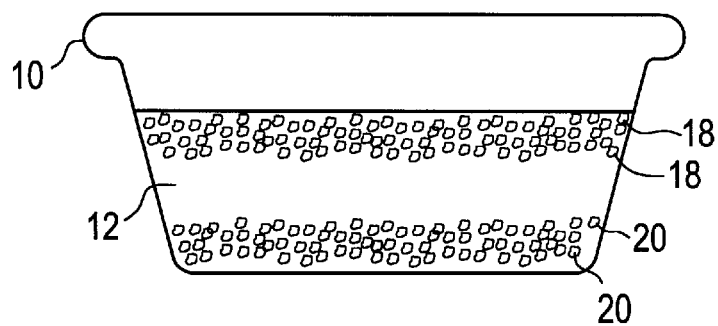
FIG. 2 illustrates a cereal product in accordance with a first preferred embodiment of the present invention wherein the cereal has a first portion having a density less than that of a liquid in which it is placed and thus floats in the liquid, and a second portion having a density greater than that of the liquid and thus sinks therein.

Referring to FIG. 2, a first preferred embodiment of the present invention is disclosed. As shown in FIG. 2, a cereal product has a first portion having a density less than that of a liquid in which it is placed and a second portion having a density greater than that of the liquid. Therefore, the first portion will float in the liquid while the second portion will sink therein. Specifically, bowl 10 includes a liquid, such as milk, 12 with a plurality of cereal pieces 18, 20 placed therein. Cereal pieces 18 have a density less than that of liquid 12 (or a specific gravity less than 1 when compared with liquid 12) and thus they float. Cereal pieces 20 have a density greater than that of liquid 12 (or have a specific gravity greater than 1 when compared to liquid 12) and thus they sink.

In the most preferred embodiment liquid 12 is milk. Liquid 12, however, could be any suitable liquid desired to be used with the cereal product by a consumer, such as water or fruit juices. Since the densities of these liquids are substantially the same, little or no variation in the actual cereal product is necessary in order to achieve the advantages of the present invention and the densities of cereal pieces 18 and 20 are such that they float and sink, respectively, in any of these liquids.

While the cereal pieces 18 and 20 are illustrated as having a generic size, shape and color, the pieces could be manufactured so as to have a size, shape or color that corresponds to each piece's buoyancy. For example, cereal pieces 20, which sink, could be formed in the shape of submarines while cereal pieces 18, which float, could be formed in the shape of ships. As another example, pieces 20 could be formed in the shaped of treasure chests and pieces 18 could be formed in the shape of pirate ships. In this manner, a consumer of the cereal product is entertained and amused while eating the cereal and thus is more likely to purchase the cereal product again. Furthermore, the color or size of the cereal pieces 18 could be differentiated from the cereal pieces 20 as desired to entertain a consumer of the cereal product.

When packaging the cereal product in accordance with the present invention, a first portion of cereal pieces 18 and a second portion of cereal pieces 20 would be included in each consumer package. While the exact amount of each cereal is not critical, the amount of the first portion preferably ranges from 20–80% of the total consumer package, more preferably 30–70% of the total consumer package, and most preferably 40–60% of the total consumer package. In this manner, the consumer is assured of receiving appropriate quantities of each of cereal pieces 18 and cereal pieces 20 so that the potential entertainment experienced while ingesting the cereal is fully realized.

Furthermore, while pieces 18 and 20 are both illustrated as cereal pieces, the present invention should not be construed to be limited to cereal per se. That is, in accordance with the present invention, one of pieces 18 and pieces 20 could be formed of fruit, confections, or other cereal additive having the appropriate density so as to sink or float and having suitable associated physical characteristics so as to amuse and entertain a consumer of the product. Thus, pieces 20 could be formed from a relatively dense cereal product having a specific gravity greater than 1 and be shaped like treasure chests, while pieces 18 could be formed from a marshmallow confection having a specific gravity less than 1 and be shaped like pirate ships.

As noted above, while cereal pieces 18 and 20 may be either puffed or unpuffed, so long as the cereal pieces have a relative density sufficient to float or sink, cereal pieces 18 may preferably be puffed and cereal pieces 20 may preferably be unpuffed. U.S. Pat. No 5,338,556 to Schwab, incorporated herein by reference, is exemplary of one method for producing a puffed, ready-to-eat cereal that could be used in accordance with the present invention. Other methods of producing puffed cereal products are well know to those of skill in the art and any such method can satisfactorily be used in combination with the present invention. With respect to cereal pieces 20, any unpuffed cereal having the required density greater than, for example, water can be used in the present invention. A variety of available unpuffed cereal products satisfy this requirement and additional cereal products can be formed using, for example, the process disclosed in U.S. Pat. No 5,622,744 to Matson et al., incorporated herein by reference. Although directed primarily to the production of animal feeds, the densification process described therein can be readily adapted by those of skill in the art for use with consumer cereal products.

Figure 3:
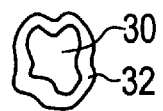
FIG. 3 illustrates another preferred embodiment of the present invention including a single cereal piece having a soluble coating formed thereon.
Figure 4A:
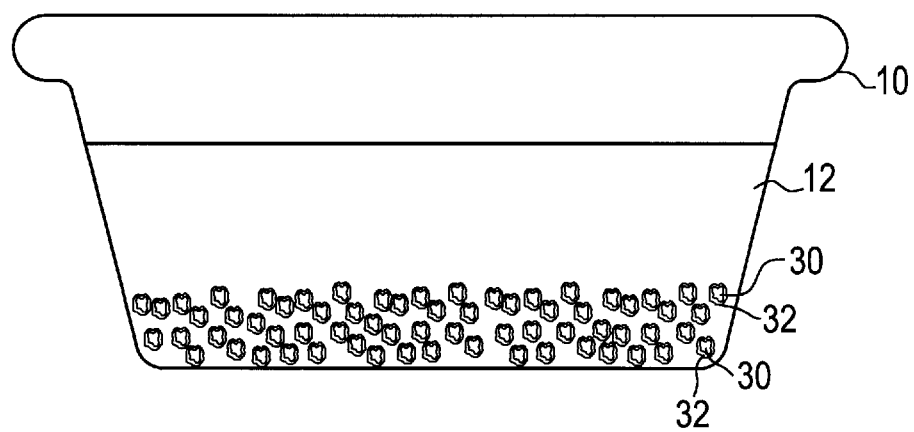
FIG. 4A illustrates the preferred embodiment of FIG. 3 wherein the cereal piece shown in FIG. 3 is placed in a liquid filled bowl with the soluble coating intact.
Figure 4B:
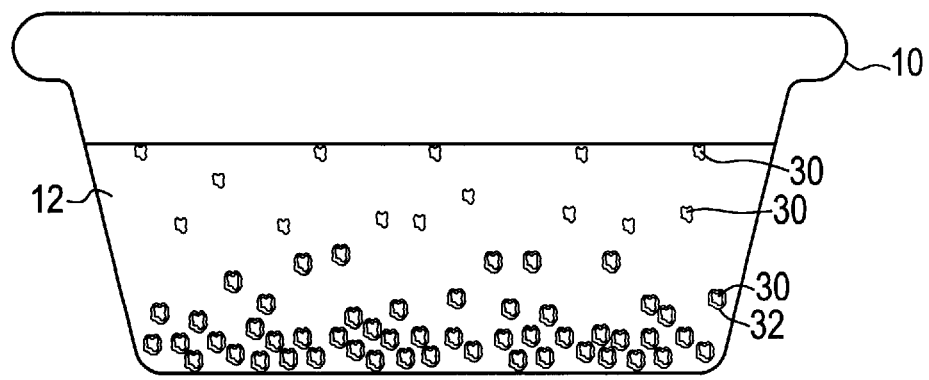
FIG. 4B illustrates the preferred embodiment of FIG. 3 wherein the cereal piece shown in FIG. 3 is placed in a liquid filled bowl and the soluble coating is partially or fully dissolved.

Referring next to FIGS. 3, 4A and 4B, an alternate preferred embodiment of the present invention is disclosed. FIG. 3 illustrates a single cereal piece 30 having a soluble coating 32 formed thereon. Cereal piece 30, without coating 32 formed thereon, has a specific gravity less than 1 so that cereal piece 30 will float in a liquid, such as liquid 12 shown in FIGS. 4A and 4B. Soluble coating 32, however has a density greater than the liquid 12 and sufficient to increase the weight of the combination of cereal piece 30 and soluble coating 32 such that they will sink in liquid 12.

Preferably, the specific gravity of cereal piece 30 is only slightly less than 1 when compared to liquid 12. In practice, as noted above, cereal piece 30 is rarely homogeneous, but rather includes variations in the physical characteristics of the material and, more importantly, contains voids or openings that form air pockets when cereal piece 30 is placed in liquid 12. Therefore, it is preferable that the effective specific gravity of cereal piece 30 (taking into account any air pockets or other incongruities) be slightly less than 1, preferably in the range of 0.80 to 0.99, even more preferably in the range of 0.90 to 0.99, and most preferably in the range of 0.95 to 0.99.

To the contrary, since it is generally desirable to maximize the volume of cereal piece 30 in comparison to the volume of soluble coating 32, the specific gravity of soluble coating 32 is preferably significantly greater than 1. Preferably the specific gravity of soluble coating 32 is in the range of 1.05 to 3.00 or more, more preferably in the range of 1.25 to 3.00 or more, and most preferably in the range of 1.50 to 3.00 or more.

In one preferred embodiment of the present invention, soluble coating 32 is formed from sucrose, having a specific gravity of 1.5877. Soluble coating 32 can further include corn syrup, water, or a triglyceride such as coconut oil, soybean oil, or cottonseed oil. Such a sucrose coating can be formed on cereal piece 30 through enrobing as disclosed, for example, in U.S. Pat. No. 5,176,936 to Creighton et al., incorporated herein by reference.

For example, cereal piece 30 could be substantially spherical with a diameter of 8 mm and have an effective specific gravity with respect to liquid 12 of 0.95. With a soluble coating 32 of sucrose (specific gravity of approximately 1.59) having a thickness of 0.4 mm, the effective specific gravity of the combination of cereal piece 30 and soluble coating 32 would be approximately 1.11. In this example, cereal piece 30 would account for approximately 75% of the total volume and soluble coating 32 would account for approximately 25% of the total volume. Thus, since the combination of cereal piece 30 and soluble coating 32 has a specific gravity greater than 1, it will initially sink when placed in liquid 12. As soluble coating 32 dissolves in liquid 12, however, the specific gravity will fall and approach 0.95, that of the cereal piece alone. When the coating is dissolved to the point that the specific gravity becomes less than 1, cereal piece 30 will slowly begin to rise in liquid 12 and event on the surface.

Therefore, from the above, it will be readily apparent to those of skill in the art that the critical considerations in connection with this embodiment of the present invention are that the effective specific gravity of cereal piece 30 alone be less than 1 and that the specific gravity be greater than 1 when soluble coating 32 is formed thereon. Those of skill in the art will recognize that various different conventional materials can be used for cereal piece 30 and soluble coating 32, and that the dimensions of these items can be varied as desired within the above constraints.

FIGS. 4A and 4B further illustrate this feature of the present invention. As seen in FIG. 4A, bowl 10 includes any suitable liquid 12 with cereal pieces 30 with soluble coating 32 placed therein. The combined weight of each cereal piece 30 with soluble coating 32 formed therein is sufficient to cause the cereal piece 30 to sink to the bottom of bowl 10. Over time, soluble coating 32 will begin to dissolve in liquid 12 and thus the specific gravity of cereal piece 30 with soluble coating 32 formed thereon will decrease. When soluble coating 32 is substantially completely dissolved, cereal piece 30 will rise toward the surface of liquid 12 and ultimately float thereon, as shown in FIG. 4B.

As with the first preferred embodiment, while the cereal pieces 30 are illustrated as having a generic size, shape and color, the pieces could be manufactured so as to have any desired size, shape or color. Furthermore, it will be readily apparent to those of skill in the art that the embodiment discussed above and illustrated in FIG. 2 could be combined with the present embodiment illustrated in FIGS. 3, 4A and 4B. That is, a first portion of the cereal product could include cereal pieces 18, shown in FIG. 2, that have a specific gravity less than 1 with respect to liquid 12 and thus float thereon. A second portion of the cereal product could include cereal pieces 30 with soluble coating 32 formed thereon, such that cereal pieces 30 rise to the surface of liquid 12 as soluble coating 12 dissolves. As an example, cereal pieces 18 could be formed in the shape of "children" and cereal pieces 30 formed in the shape of an "animal" or "monster," so that a consumer of the cereal product is amused by the challenge of eating the "children" before the "monsters" rise.

Figure 5:
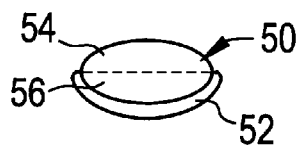
FIG. 5 illustrates another preferred embodiment of the present invention wherein a single cereal piece includes a first portion and a second portion, and a soluble coating is only formed on the second portion of the cereal piece.
Figure 6A:
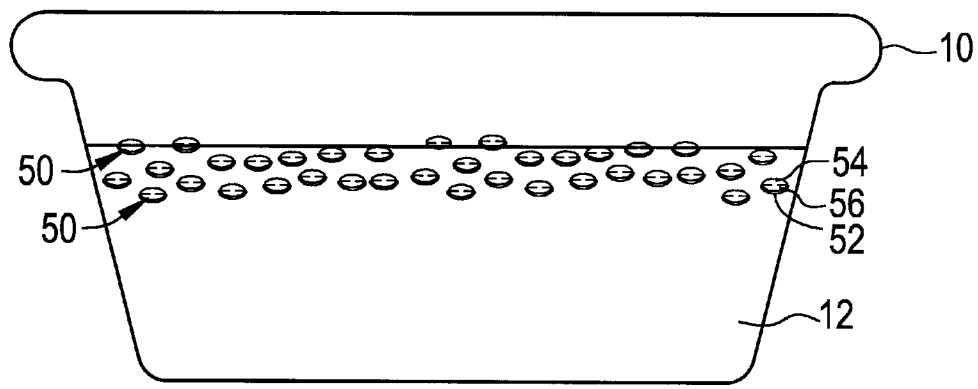
FIG. 6A illustrates the preferred embodiment of FIG. 5 wherein the cereal piece shown in FIG. 5 is placed in a liquid filled bowl with the soluble coating intact.
Figure 6B:
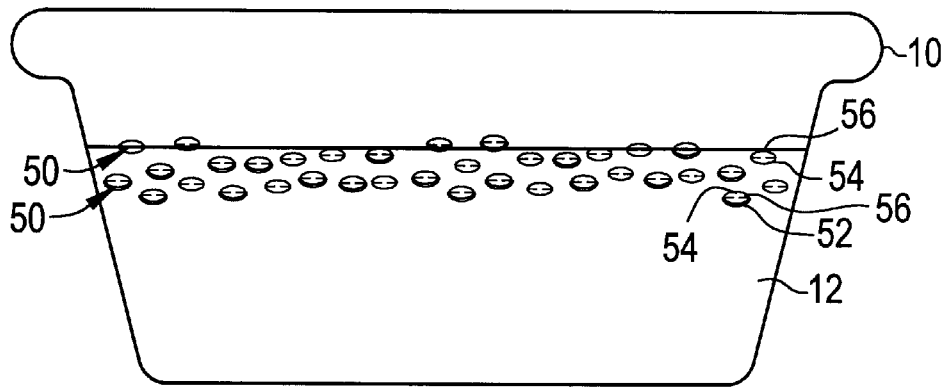
FIG. 6B illustrates the preferred embodiment of FIG. 5 wherein the cereal piece shown in FIG. 5 is placed in a liquid filled bowl and the soluble coating is partially or fully dissolved.

Referring next to FIGS. 5, 6A and 6B, another alternate preferred embodiment of the present invention is disclosed. FIG. 5 illustrates a single cereal piece 50 having a soluble coating 52 formed thereon similar to cereal piece 30 and soluble coating 32 discussed above in connection with FIG. 3. In the present embodiment shown in FIG. 5, however, cereal piece 50 includes a first portion 54 and a second portion 56, and soluble coating 52 is only formed on second portion 56 of cereal piece 50. The combination of first portion 54, second portion 56, and soluble coating 52 taken together has an effective specific gravity less than 1 so that cereal piece 50 will generally float in a liquid, such as liquid 12 shown in FIGS. 6A and 6B. Furthermore, first portion 54 has a higher density than second portion 56, but the combination of second portion 56 and soluble coating 52 will have a higher effective specific gravity than will first portion 54 taken alone.

As will be described in more detail below, this embodiment of the present invention realizes a novel cereal product wherein each cereal piece 50 will initially float on the surface of liquid 12 with first portion 54 toward the top. As soluble coating 52 dissolves, cereal piece 50 will rotate, or "flip," so that second portion 56 is toward the top.

As in the embodiment discussed above in connection with FIG. 3, the specific gravity of the combination of cereal piece 50 and soluble coating 52 is less than 1 when compare to liquid 12. Therefore, since soluble coating 52 will have a specific gravity greater than 1, it is necessarily follows that cereal piece 50 alone will also have a specific gravity less than 1. As discussed above, first portion 54 and second portion 56 of cereal piece 50 are rarely homogeneous, but rather include variations in the physical characteristics of the material and contain voids or openings that form air pockets within cereal piece 50. Therefore, it is preferable that the "effective specific gravity" of cereal piece 50 (taking into account any air pockets or other incongruities) be less than 1, preferably in the range of 0.25 to 0.99.

Furthermore, in accordance with this embodiment of the present invention, first portion 54 will have a greater specific gravity than second portion 56. In practice, the exact difference in the specific gravity between first portion 54 and second portion 56 is not critical, provided that first portion 54 also has a specific gravity less than the effective specific gravity of the combination of second portion 56 and soluble coating 52.

For example, where soluble coating 52 comprises sucrose having a specific gravity of approximately 1.59 and a volume of 50 mm$^3$, first portion 54 has a volume of 150 mm$^3$, and second portion 56 has a volume of 150 mm$^3$, then the specific gravity of first portion 54 could be approximately 0.70 and the specific gravity of second portion 56 could be approximately 0.50. Under these conditions, the total effective specific gravity of the combination of cereal piece 50 and soluble coating 52 would be approximately 0.74, and thus would float on liquid 12. Furthermore, the effective specific gravity of the combination of second portion 56 and soluble coating 52 would be approximately 0.77, which is greater than the specific gravity (approximately 0.70) of first portion 54 alone. In this case, cereal piece 50 would account for approximately 86% of the total volume and soluble coating 52 would account for approximately 14% of the total volume.

Thus, since the combination of cereal piece 50 and soluble coating 52 has a specific gravity less than 1, it will float when placed in liquid 12. Furthermore, since the effective specific gravity of the combination of second portion 56 and soluble coating 52 is greater than that of first portion 54, cereal piece 50 will tend to float with first portion 54 on top. As soluble coating 32 dissolves in liquid 12, however, the effective specific gravity of the combination of second portion 56 and soluble coating 52 will fall and approach that of the first portion 54. When the coating is dissolved to the point that this effective specific gravity becomes less than that of the first portion, cereal piece 50 will slowly rotate so that second portion 56 is on top.

Therefore, from the above, it will be readily apparent to those of skill in the art that the critical considerations in connection with this embodiment of the present invention are that the specific gravity of first portion 54 be greater than that of second portion 56, that the effective specific gravity of the combination of second portion 56 and soluble coating 52 be greater than that of first portion 54, and that the total effective specific gravity of the combination of cereal piece 50 and soluble coating 52 be less than 1. Those of skill in the art will recognize that various different conventional puffed and unpuffed cereal materials can be used for first portion 54, second portion 56, and soluble coating 52, and that the dimensions of these items can be varied as desired within the above constraints.

FIGS. 6A and 6B further illustrate this feature of the present invention. As seen in FIG. 6A, bowl 10 includes any suitable liquid 12 with cereal pieces 50 having soluble coating 52, floating therein. The combined weight of each cereal piece 50 with soluble coating 52 formed thereon is insufficient to cause the cereal piece 50 to sink. Furthermore, the combined weight of second portion 56 and soluble coating 52 is sufficient to cause cereal piece 50 to float with first portion 54 generally to the top. Over time, soluble coating 52 will begin to dissolve in liquid 12 and thus the effective specific gravity of the combination of second portion 56 and soluble coating 52 will decrease. When soluble coating 52 is substantially completely dissolved, cereal piece 50 will rotate, as shown in FIG. 6B, such that second portion 56 is toward the top.

As with the first and second preferred embodiments, while the cereal pieces 50, and more specifically first portion 54 and second portion 56, are illustrated as having a generic size, shape and color, the pieces could be manufactured so as to have any desired size, shape or color. As an example, first portion 54 could be formed of a first color and second portion 56 could be formed of a second color so that a consumer of the cereal product is amused by the challenge of eating the cereal before it changes colors. Furthermore, it will be readily apparent to those of skill in the art that the embodiments discussed above and illustrated in FIGS. 2, 3, 4A and 4B could be readily combined with the present embodiment illustrated in FIGS. 5, 6A and 6B.

While the present invention has been described with reference to a preferred embodiment, it should be appreciated by those skilled in the art that the invention may be practiced otherwise than as specifically described herein without departing from the spirit and scope of the invention. It is, therefore, to be understood that the spirit and scope of the invention be limited only by the appended claims.

We claim:

1. A consumer cereal product intended for human consumption comprising a mixture of cereal pieces including a first portion of cereal pieces, each piece having a specific gravity, with respect to a liquid, greater than 1, and a second portion of cereal pieces, each piece having a specific gravity, with respect to said liquid less than 1, wherein each piece in said first portion of cereal pieces will sink in said liquid, and each piece of said second portion of cereal pieces will float on said liquid, said consumer cereal product being edible by humans.

2. The consumer cereal product of claim 1 wherein one of said first and second portions comprises at least 20% of the consumer cereal product and the other of said first and second portions comprises the remainder.

3. The consumer cereal product of claim 1 wherein one of said first and second portions comprises at least 30% of the consumer cereal product and the other of said first and second portions comprises the remainder.

4. The consumer cereal product of claim 1 wherein one of said first and second portions comprises at least 40% of the consumer cereal product and the other of said first and second portions comprises the remainder.

5. The consumer cereal product of claim 1 wherein said liquid is milk.

6. The consumer cereal product of claim 5 wherein said milk is bovine milk.

7. The consumer cereal product of claim 1 wherein said liquid is water.

8. The consumer cereal product of claim 1 wherein said liquid is a fruit juice.

9. The consumer cereal product of claim 1 wherein said first portion has a different shape than said second portion.

10. The consumer cereal product of claim 1 wherein said first portion has a different color than said second portion.

11. The consumer cereal product of claim 1 wherein said first portion has a different size than said second portion.

12. The consumer cereal product of claim 1 wherein said first portion has a different taste than said second portion.

13. The consumer cereal product of claim 1, wherein each cereal piece of said first portion has a soluble coating thereon to form a plurality of coated cereal pieces.

14. The consumer cereal product of claim 13 wherein said soluble coating comprises sucrose.

15. The consumer cereal product of claim 14 wherein said soluble coating has a specific gravity of approximately 1.59.

16. The consumer cereal product of claim 13 wherein said soluble coating has a specific gravity of 1.05 to 3.00.

17. The consumer cereal product of claim 13 wherein said soluble coating has a specific gravity of 1.25 to 3.00.

18. The consumer cereal product of claim 13 wherein said soluble coating has a specific gravity of 1.50 to 3.00.

19. The consumer cereal product of claim 13, wherein each of said plurality of coated cereal pieces has a specific gravity relative to said liquid greater than 1.

20. The consumer cereal product of claim 19 wherein said specific gravity of each cereal piece in said second portion is about 0.80 to 0.99.

21. The consumer cereal product of claim 19 wherein said specific gravity of each cereal piece in said second portion is about 0.90 to 0.99.

22. The consumer cereal product of claim 19 wherein said specific gravity of each cereal piece in said second portion is about 0.95 to 0.99.

23. A consumer cereal product intended for human consumption comprising a plurality of cereal pieces, each piece having an effective specific gravity, with respect to a liquid, less than one, each of said plurality of cereal pieces comprising a first portion, a second portion, and a soluble coating formed on said second portion, wherein said first portion has a density greater than said second portion, and the combination of said second portion and soluble coating has a density greater than the density of said first portion, said consumer cereal product being edible by humans.

24. The consumer cereal product of claim 23 wherein said liquid is milk.

25. The consumer cereal product of claim 24 wherein said milk is bovine milk.

26. The consumer cereal product of claim 23 wherein said liquid is water.

27. The consumer cereal product of claim 23 wherein said liquid is fruit juice.

28. The consumer cereal product of claim 23 wherein the effective specific gravity of each of said plurality of cereal pieces with respect to said liquid is from about 0.25 to 0.99.

29. The consumer cereal product of claims 23 wherein each of said plurality of cereal pieces floats when placed in said liquid with said first portion toward the top when said soluble coating is intact.

30. The consumer cereal product of claim 23, wherein each of said plurality of cereal pieces floats when placed in said liquid with said second portion toward the top without said soluble coating.

31. The consumer cereal product of claim 23, wherein the specific gravity of said first portion with respect to said liquid is approximately 0.70 and the specific gravity of said second portion with respect to said liquid is approximately 0.50.

32. The consumer cereal product of claim 23 wherein said first portion has a different color than said second portion.

33. The consumer cereal product of claim 23 wherein said first portion has a different taste than said second portion.

34. The consumer cereal product of claim 23 wherein said soluble coating comprises sucrose.

* * * * *